(12) United States Patent  
Zurecki

(10) Patent No.: US 8,715,772 B2  
(45) Date of Patent: *May 6, 2014

(54) THERMAL DEPOSITION COATING METHOD

(75) Inventor: Zbigniew Zurecki, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1956 days.

This patent is subject to a terminal disclaimer.

(21) Appl. No.: 11/389,308

(22) Filed: Mar. 27, 2006

(65) Prior Publication Data

US 2006/0228465 A1    Oct. 12, 2006

Related U.S. Application Data

(60) Provisional application No. 60/670,497, filed on Apr. 12, 2005.

(51) Int. Cl.
| | |
|---|---|
| *C23C 4/00* | (2006.01) |
| *B05D 1/02* | (2006.01) |
| *B05D 1/08* | (2006.01) |
| *B23K 9/04* | (2006.01) |
| *B23K 10/02* | (2006.01) |
| *B23K 26/00* | (2006.01) |

(52) U.S. Cl.
USPC ............... 427/8; 427/446; 427/449; 427/596; 219/121.47; 219/121.64; 219/121.85; 219/76.1; 219/76.14; 219/76.16

(58) Field of Classification Search
USPC .......................................................... 427/8
See application file for complete search history.

(56) References Cited

U.S. PATENT DOCUMENTS

| 3,862,857 A | 1/1975 | Gambino |
|---|---|---|
| 5,413,164 A | 5/1995 | Teshima et al. |
| 6,648,053 B2 | 11/2003 | Allor et al. |

(Continued)

FOREIGN PATENT DOCUMENTS

| EP | 0 960 955 A1 | 12/1999 |
|---|---|---|
| EP | 1 038 987 B1 | 12/2003 |

(Continued)

OTHER PUBLICATIONS

Nuse, J.D., et al., "Surface Finishing of Tungsten Carbide Cobalt Coatings Applied by HVOF for Chrome Replacement Applications", Aerospace/Airline Plating and Metal Finishing Forum, Mar. 27, 2000, pp. 1-12, Cincinatti, OH.

(Continued)

*Primary Examiner* — Katherine A Bareford
(74) *Attorney, Agent, or Firm* — Anne B. Kiernan

(57) ABSTRACT

A process for the thermal deposition coating of a workpiece is provided that comprises the steps of:
  thermally depositing a coating on a metallic surface of a workpiece from a deposition head wherein at least one condition selected from the group of: coating deposition rate onto said surface, relative motion between the surface and said deposition head, and cryogenic coolant application rate onto said workpiece is controllable;
  substantially simultaneously measuring temperatures at a plurality of locations over the metallic surface of the workpiece;
  determining an average temperature of the temperatures measured in step (b);
  comparing the average temperature to a preselected minimum temperature and a preselected maximum temperature for the workpiece; and
  adjusting at least one of the controllable conditions if said average temperature is not between the preselected minimum temperature and the preselected maximum temperature for the workpiece.

19 Claims, 5 Drawing Sheets

(56) References Cited

U.S. PATENT DOCUMENTS

| | | | |
|---|---|---|---|
| 6,740,624 | B1 | 5/2004 | Hoste et al. |
| 6,945,306 | B2 | 9/2005 | Duncan et al. |
| 8,293,035 | B2 * | 10/2012 | Zurecki et al. ............... 148/511 |
| 2001/0033952 | A1 | 10/2001 | Jenson et al. |
| 2004/0020624 | A1 * | 2/2004 | Duncan et al. ............... 164/46 |
| 2007/0049044 | A1 | 3/2007 | Marsh |
| 2008/0087359 | A1 * | 4/2008 | Zurecki et al. ............... 148/511 |

FOREIGN PATENT DOCUMENTS

| | | |
|---|---|---|
| EP | 1381732 B1 | 9/2006 |
| EP | 1 712 962 A1 | 10/2006 |
| FR | 2 211 544 A | 7/1974 |
| GB | 998 239 A | 7/1965 |
| JP | 06-287737 * | 10/1994 |
| JP | 2004-512941 A | 4/2004 |
| WO | WO 89/12116 A | 12/1989 |
| WO | WO 98/26104 | 6/1998 |
| WO | 99/01674 A1 | 12/1999 |
| WO | 99/61674 A1 | 12/1999 |
| WO | WO 99/61674 A | 12/1999 |
| WO | WO 02/083971 A1 | 10/2002 |
| WO | WO 02/083972 A1 | 10/2002 |
| WO | WO 03/035322 A | 5/2003 |
| WO | 2006/115530 A | 11/2006 |

OTHER PUBLICATIONS

Stokes, J., et al., "HVOF System Definition to Maximise the Thickness of Formed Components", Proceedings of the International Conference on Advances in Materials and Processing Technologies (AMPT '99). Dublin, Ireland, Aug. 3-6, 1999, pp. 775-784.

Lucchese, P., et al., "Optimization of Robotic Trajectories in the Atmosphere and Temperature Controlled Plasma Spray Process on Ceramic Substrate Using Heat Flow Modelling", Proceedings of the 1993 National Thermal Spray Conference, Jun. 7-11, 1993, pp. 231-239, Anaheim, CA.

Jones, P. D. A., et al.; "Control of Temperature Profile for a Spray Deposition Process"; IEEE Transactions on Control Systems Technology; vol. 11, No. 5; Sep. 2003; pp. 656-667; USA; XP002392922.

Jones, P.D.A.; et al.; "Estimating the Surface Temperature Profile from a Sequence of Partial Thermal Images"; Proceedings of SPIE—The International Society for Optical Engineering SPIE—Int. Soc. Opt. Eng. USA; vol. 4571; 2001; pp. 199-207; XP002392923.

Pathirana, Pubudu et al.; "Control of Average Temperature in a Spray Deposition Process"; Proceedings of the 2002 IEEE International Conferences on Control Applications; Sep. 16-20, 2002; vol. 2; pp. 1004-1009; Glasglow, Scotland, U.K.; XP-002392924.

Duncan, S.R., et al; "Control of Temperature Profile for a Spray Deposition Process"; IEEE Transactions on Control Systems Technology, IEEE Service Center; New York, NY; vol. 11, No. 5; Sep. 1, 2003; pp. 656-667; XP-011100691.

Jones, et al; "Control of Temperature Profile for a Spray Deposition Process"; IEEE Transactions on contorl systems technology; Sep. 2003; vol. 11, No. 5; pp. 656-667.

\* cited by examiner coating sequence:
a->b->a->b   or   a->b, a->b, ...

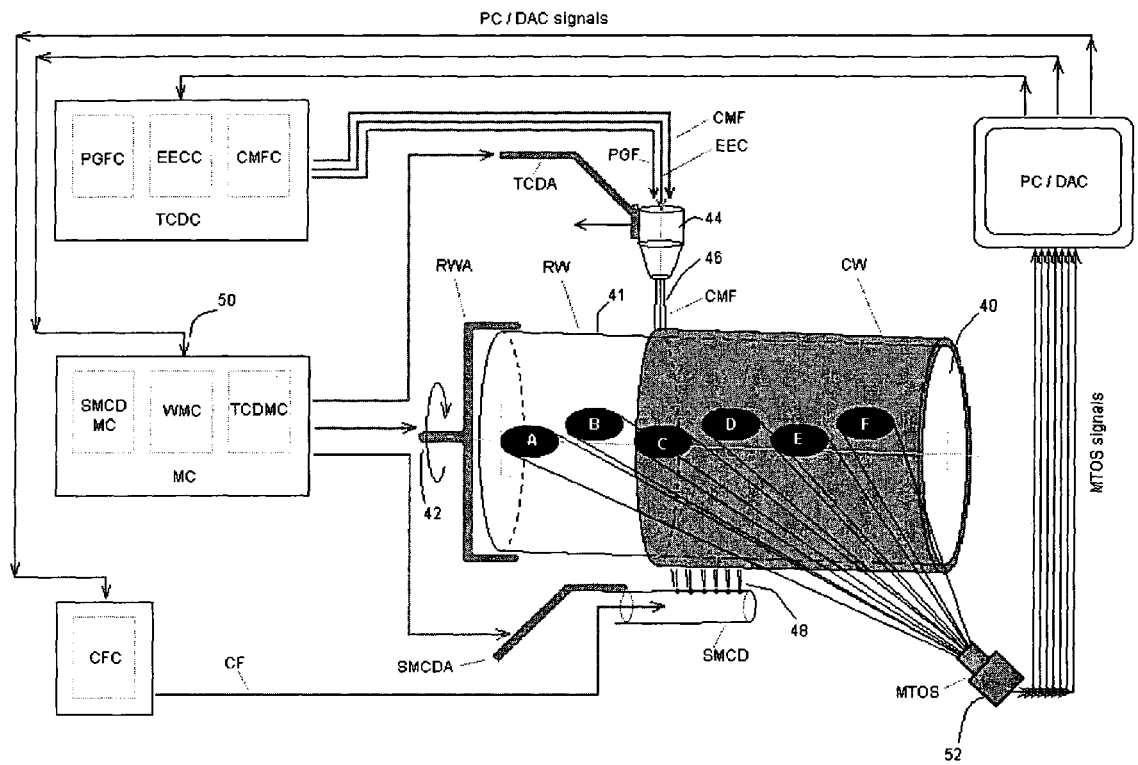

SMCD - stationary or moving coolant distributor
A, B, ... F - temperature control areas
RW - rotating workpiece
CW - coated section of workpiece
MTOS - multipoint optical thermal sensor
PC / DAC - computer data acquisition and control
TCDC - thermal coating device controller
CMFC - coating material flow controller
EEC - electric energy circuit
EECC - electric energy circuit controller
PGF - process gas flow
PGFC - process gass flow control
CF - coolant flow
CFC - coolant flow controller
TCDA - thermal coating device actuator or holder
SMCDA - coolant distributor actuator or holder
RWA - workpiece actuator or holder
MC - motion controller
WMC - workpiece motion controller
TCDMC - thermal coating device motion controller
SMCDMC - coolant distributor motion controller

FIGURE 4

SAR - single area reading
MRR - multi-area reading
CMRR - cumulative multi-area reading

THERMAL DEPOSITION COATING METHOD

This application claims priority to a provision application 60/670,497, filed Apr. 12, 2005, entitled "Control Method for Thermal Deposition Coating Operations, which is incorporated in its entirety herein by reference.

BACKGROUND OF THE INVENTION

Processes for applying various coatings such as metallic, alloy, ceramic and composite to a variety of substrates to form component products using thermal deposition coating methods are known. Such processes are employed to improve properties of the substrate such as hardness, corrosion resistance, heat resistance surface porosity and the like. Exemplary thermal deposition coating operations include: high-velocity oxy-fuel spraying (HVOF) and high-velocity air-fuel spraying (HVAF), DC and RF plasma spray in air atmosphere, vacuum chamber and/or inert gas chamber, electric arc (twin and single wire) spraying, laser powder coating or cladding, transferred arc coating operations such as plasma transferred-arc powder coating and welding overlay deposition, and so forth.

Thermal deposition coating operations deposit a preheated and/or molten coating material onto the surface of a substrate. In the coating process, multiple passes of a thermal deposition head are made over the surface of the workpiece each pass depositing a layer of coating material. A significant amount of energy, typically manifested as heat, is required to thermally deposit the coating material onto the workpiece and a portion of this energy is at least partially carried to the workpiece. Improper temperature control during thermal deposition frequently, leads to coating and workpiece overheating, thermal degradation, and damaging thermal stresses due to a mismatch of thermal contraction coefficients between the coating and substrate surface. When damage occurs through overheating, thermal stress and the like, the resulting coatings may be poorly adhering, or even fractured.

Heat removal from the workpiece during thermal deposition coating is critical and one of the most popular ways of practicing heat removal during the thermal deposition coating operation is to introduce breaks in the process cycle so that the accumulated heat is dissipated to the surroundings. Cooling air jets are often used to offset the loss of process productivity due to such a practice but (a) air cooling is usually insufficient and (b) the oxygen along with residual moisture and hydrocarbons present in the cooling air often are detrimental to the quality of coating.

The search for effective heat removal methods in terms of coolants for maximizing coating quality in the resulting component and/or process productivity led to the development of refrigerated and cryogenic gas cooling. While cryogenic cooling methods offer a significant enhancement in the ability to remove heat fast, they are rarely used in the thermal deposition coating industry because of an even further increased difficulty, or a narrower margin for error, in controlling temperature, i.e., heat build-up and thermal uniformity within the workpiece during coating.

Representative articles and patents illustrating thermal deposition coating processes some including the use of cryogenic coolants are as follows:

Nuse, J. D. and Falkowski, J. A. *Surface Finishing of Tungsten Carbide Cobalt Coatings Applied by HVOF for Chrome Replacement Application*, Aerospace/Airline Plating and Metal Finishing Forum, Cincinnati, Ohio, Mar. 27, 2000, disclose the use of HVOF for the application of tungsten carbide coatings in nose and landing gear substrates for aircraft as a replacement for chrome based coatings.

Stokes, J. and Looney, L., *HVOF System Definition to Maximise the Thickness of Formed Substrates*, Proceedings of the International Conference on Advances in Materials and Processing Technologies (AMPT '99), Dublin, Ireland, 3-6$^{th}$ Aug. 1999, pp. 775-784, disclose the use of HVOF to apply alumina-calcia stabilized zirconia deposits, CoNiCrAlY deposits and carbide deposits using carbon dioxide as a coolant. The effects of spray distance and forced cooling were determined.

Lucchese, P., et al., *Optimization of Robotic Trajectories in the Atmosphere and Temperature Controlled Plasma Spray Process on Ceramic Substrate Using Heat Flow Modelling*, Proceedings of the 1993 National Thermal Spray Conference, Anaheim, Calif., 7-11 Jun. 1993, pp. 231-239 disclose the use of atmosphere and temperature controlled plasma spraying using liquid argon as a coolant. A refractory powder was sprayed on a rotatable ceramic workpiece with a robotic trajectory. A recording IR camera positioned in the plasma spraying area was used to measure temperature verses time and use those results to reduce heat fluxes and avoid substrate and coating destruction.

U.S. Pat. No. 6,740,624 B1 and EP 0 960 955 A1) disclose a method for providing a coating of metal oxides onto a substrate at thicknesses of generally greater than 5 mm by flame or plasma spraying. Cryogenic cooling of the back side of the substrate is performed during thermal spraying. The use of a single-point infrared sensor associated with a single-point cryogenic coolant source is suggested with the additional option of multiplying such sensor-cryogen source couples over the substrate surface.

U.S. Pat. No. 6,648,053 B2, WO 02/083971 A1, WO 02/083972 A1 and EP 1 038987 B1, disclose the use of coolant-free, sensed surface temperature-based thermal control methods and apparatus for an electric arc-spray-forming of thick deposits (billets) in an automated spray cell using a thermally insulating ceramic substrate, characterized by reduced distortion and internal stresses. The disclosed surface temperature sensing is based on real-time, two-dimensional mapping of spray-deposited surface using a multi-point measurement, thermographic or thermo-imaging (thermo-vision) camera.

The process control algorithm synchronizes the thermographic camera coordinates with the robotic sprayer coordinates, and when hot spots develop on the surface of the workpiece such hot spots are eliminated by controlling the amount of material sprayed on these hot spot areas by manipulation of the traverse speed and positioning of the robotic spray-forming gun.

BRIEF SUMMARY OF THE INVENTION

This invention relates to an improvement in a process for the thermal deposition of coatings onto a workpiece comprised of a thermally conductive substrate surface employing a cryogenic coolant as an aid for the removal of heat during thermal deposition coating of the workpiece. The invention is a process for the thermal deposition coating of a workpiece, said process comprising the steps of:

(a) thermally depositing a coating on a thermally conductive surface of a workpiece from a deposition head wherein at least one condition selected from the group of: coating deposition rate, relative speed between the surface and said deposition head, and cryogenic coolant rate is controllable during said process;

(b) substantially simultaneously measuring temperatures at a plurality of locations over the surface of the workpiece;

(c) determining an average temperature of the temperatures measured in step (b);

(d) comparing the average temperature to a preselected minimum temperature and a preselected maximum temperature for the workpiece; and (e) automatically adjusting at least one of the controllable conditions if said average temperature is not between the preselected minimum temperature and the preselected maximum temperature for the workpiece. This step is performed while continuing to thermally deposit the coating, and then the process steps are repeated.

In a second embodiment of the invention, local stresses are minimized in the coated workpiece that are typically caused by nonuniform temperatures between various portions of the workpiece due to workpiece geometry, non-optimum coolant application, and other, unoptimized parameters of the thermal deposition process. This may be is accomplished by calculating the standard deviation of all temperature readings and controlling the relative motion (speed) between the thermal coating deposition head and the workpiece in response to predetermined values for the standard deviation. The second embodiment includes the steps (a) to (e) above and the additional steps of:

(f) determining the standard deviation between said average temperature and a cumulation of said measured temperatures;

(g) comparing the standard deviation to a first preselected standard deviation, S1; and (h) automatically adjusting at least one of the controllable conditions if said standard deviation is greater than the first preselected standard deviation, S1. This step is performed while continuing to thermally deposit the coating. Then the process steps are repeated.

In the third embodiment of this invention is included the additional steps of:

(i) comparing the standard deviation to a second preselected standard deviation, S2; and (j) automatically suspending the coating deposition rate if said standard deviation is greater than a second preselected standard deviation, S2. Steps (i) and (j) may be performed before or after steps (f), (g) and (h). Then the process steps may be repeated.

Advantages can be achieved based upon the control process for forming coatings on thermally conductive substrates by thermal deposition coating methods employing cryogenic coolants and they may include one or more of the following: an ability to achieve excellent coating production rates without the risk of overheating and thermally damaging the substrate material; an ability to produce well adhering, uniform coatings on workpieces while minimizing damaging internal stresses between the coating and the substrate surface in the coated workpiece; an ability to provide temperature control for difficult to control operations involving cryogenic coolant media, which may also include simplicity of implementation in production environment, reliable thermal measurement in spite of various momentary process upsets, and acceptance of both contact and non-contact sensor measurement; and, an ability to employ mixed inputs from differing temperature sensing devices.

BRIEF DESCRIPTION OF THE DRAWINGS

FIG. 4 is a system which can be used in process of this invention showing one embodiment of thermal deposition coating, cryogenic cooling, and control systems for a cylindrical workpiece.

DETAILED DESCRIPTION OF THE INVENTION

The processes of this invention are useful in any thermal deposition coating operations including: high-velocity oxy-fuel spraying (HVOF) and high-velocity air-fuel spraying (HVAF), DC and RF plasma spray in air atmosphere, vacuum chamber and/or inert gas chamber, electric arc (twin and single wire) spraying, laser powder coating or cladding, transferred arc coating operations such as plasma transferred-arc powder coating and welding overlay deposition.

Figure 1:
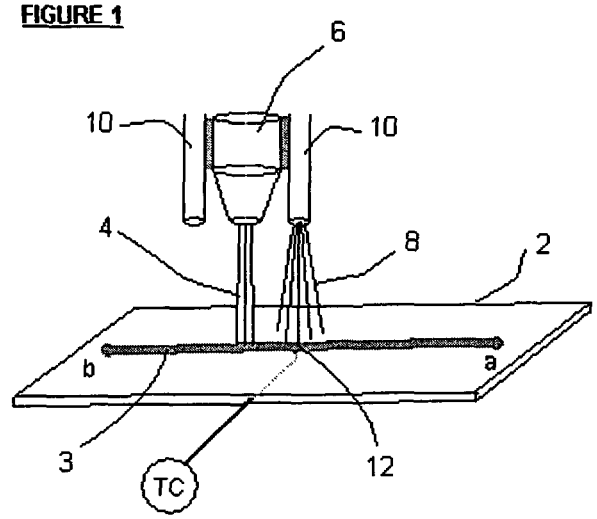
FIG. 1 is a view of a simplified, reciprocal thermal deposition coating operation illustrating single point temperature measurement.

To facilitate an understanding of the concepts leading to the invention, reference is made to the drawings. FIG. 1 depicts a simplified thermal deposition coating operation wherein a coating material at elevated temperature is applied to a workpiece. In FIG. 1, a workpiece 2 comprised of a workpiece substrate surface 3 is coated with a coating material 4 deposited from thermal deposition head 6. Thermal deposition head 6 is reciprocated between point a and point b over the surface 3 of workpiece 2 and the coating material 4 applied on the surface 3 of workpiece 2 along the line ab. This means that the stroke time (t stroke) from a to b is much less than the time required to complete the entire coating operation. Thus, industrial practice generally requires several scans or reciprocations of the thermal head 6 to produce a coating having a preselected thickness over preselected areas of the workpiece or over the entire surface 3 of workpiece 2. A cryogenic coolant 8 is supplied from a coolant supply 10 to the surface 3 of workpiece 2 to assist in the removal of heat as the thermal deposition head moves from point a to point b. The process is reversed as the thermal deposition head moves from point b to point a. Rapid removal of heat from the workpiece 2 allows for increased production rates by keeping the overall temperature below a preselected design maximum temperature (Tmaxi) and above a minimum temperature (Tmini) for the workpiece. Instantaneous temperature readings are recorded by thermocouple 12.

Tmaxi and Tmini are "arbitrarily" set by the operator of thermal spray coating system based on component geometry and material considerations. For example, Tmini is usually set just above the boiling point of water in the thermal spray processes based on combustion heating, e.g. HVOF (high-velocity, oxy-fuel) spraying with H2-flame or hydrocarbon flame. Other considerations could be used to set Tmini in the case of plasma spray coating in vacuum chamber. Tmaxi is usually set at the level preventing thermomechanical degradation of substrate material. If a heat-treated and low-temperature tempered steel component is thermally spray-coated, Tmaxi may be set at the level of 200 or 300 degrees C. to prevent unwanted material softening. Similar approach can be used in presetting Tmaxi for aged aluminum alloys, polymer composite components, and complex geometry components which tend to concentrate damaging thermal stresses.

The use of the term "thermal head" means the part of the thermal coating device from which the material to be coated on the workpiece surface exits the thermal coating device to coat the surface of the workpiece. The thermal head includes thermal spraying guns (and includes HVOF, APS, VPS, arc-spray, flame, etc.) as well as MIG welding torches which can be used for weld overlay coating, laser powder spray coating systems, PTA powder and wire coating systems (a hybrid of plasma and welding) and the like.

Representative cryogenic coolants (coolants having a temperature below −70° C. below −100° C.), which may be used in the thermal deposition process that involves jetting at least a portion of that coolant on the coated, partly coated, and/or yet to be coated workpiece surface 3, include inert coolants, e.g., noble gases such as argon or helium for all types of coating materials, nitrogen for the majority of metallic, carbide, nitride, and boride coatings, and, optionally carbon dioxide, or air for non-oxidizing, usually oxide-containing coatings such as alumina, zirconia, titania, hydroxyapatite, perovskites, etc. The infrequent situation when a noble gas coolant rather than nitrogen, even if cryogenic, must be used with metals involves spraying of titanium, tantalum, magnesium and similar, reactive metal coatings which form nitrides quickly. Specific thermally deposited coating materials suited for the practice of the invention are selected from the group of metals, alloys, intermetallic compounds, oxide-, carbide-, boride-, and nitride-ceramics, composites, and any of their combinations. The coolant may be a liquid or gas or both.

Figure 2:
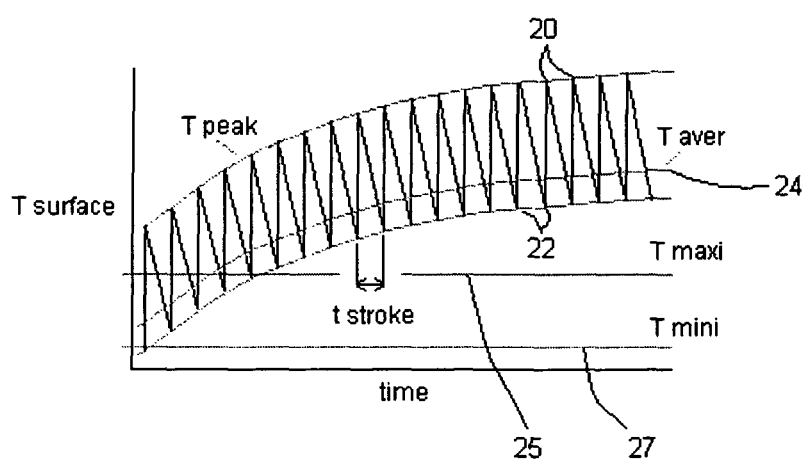
FIG. 2 is a plot of the single-point temperature measurement of the interface between the workpiece and the coating verses time illustrating a temperature cycle in the thermal deposition operation shown in FIG. 1.

FIG. 2 is a plot of the instantaneous temperature measured by thermocouple 12 versus time as the thermal deposition head 6 shown in FIG. 1 deposits coating material 4 between points a and b in absence of the coolant. In a thermal deposition coating operation, peak temperatures represented at temperature points, T peak 20, are generated with each pass over the thermocouple. As the thermal deposition head moves away from the thermocouple, the temperature of the workpiece at the thermocouple decreases as a result of the heat dissipating within workpiece 2 via conduction, by radiation and by convection resulting in a lower minimum temperature 22. The line Taver 24 is a calculated average temperature. (Its significance is described in subsequent paragraphs with respect to the invention.) The design, preselected maximum temperature for the workpiece, is designated Tmaxi 25, and the design, preselected minimum temperature for the workpiece, is designated Tmini 27. The Tmaxi is the preferred maximum temperature for the workpiece in the coating system and Tmini is the preferred minimum temperature for the workpiece in the coating system. As shown in FIG. 2, the temperature of the system quickly moves above the Tmaxi, therefore the coating will not be as desired, and/or may be defective.

The deposition method illustrated in FIG. 1 uses a single source temperature measurement that cannot adequately solve the problems of heat removal from the workpiece 2 and nonuniform temperatures in various locations of the workpiece that may be above Tmaxi or below Tmini. Moreover, the use of a fixed-point temperature sensor does not address various momentary process measurement upsets, including the thermal sensor location (with respect to the thermal deposition head at the time-point of taking the temperature measurement), and overreacting temperature sensors. Overreacting temperature sensing may be caused by overshadowing and blinding of temperature sensors by spray plume, dust, cryogenic vapor or ice cloud, the traversing thermal deposition head itself and hot material plume. Overreacting temperature sensing may also be caused by localized shifts in the emissivity and thermal fields of workpiece surface, which are a function of location on the workpiece surface, and the measurement time.

The thermal input data typically generated using the single source temperature method presented in FIG. 2, above, led Applicant to the recognition that:
the temperature of a workpiece during the coating operation must be represented in a more uniform way than before, in order to be able to use it for control purposes; the use of a thermally conductive substrate surface, i.e., a thermally conductive workpiece or surface of the workpiece, will be necessary to even-out local thermal gradients generated on the surface of the workpiece during thermal coating; and, substantially simultaneous reading of surface temperatures in multiple areas and averaging them would be helpful to control the deposition process. The integrity and adhesion of thermal coatings, which are affected by local and temporal temperature gradients generated on the surface of the workpiece during thermal coating, depends primarily on limiting large-scale expansion or contraction of the entire workpiece because of a mismatch between the thermal expansion coefficients of the workpiece and the coating material. Minimizing large scale expansion and contraction requires maintaining the average temperature of the workpiece between Tmini and Tmaxi.

The present invention provides for the use of a thermally conductive substrate, which may be metallic, as the workpiece to be coated and in some embodiments the total coating thickness which may be put down in multiple passes over the surface of the workpiece substrate, will be less than half the thickness of the substrate at its thinnest cross section. Stated another way, the thermally conductive substrate is at least two times thicker in its thinnest cross-section than the thickness of the resultant deposited coating. Another aspect of the present invention is that of substantially simultaneously using multiple contact or non-contact temperature inputs for process control and, while using them, averaging their momentary readings of the surface temperature of the workpiece over a predetermined time-span and over a predetermined surface area.

In the development of a control process for the thermal deposition of coating materials onto a thermally conductive substrate Applicant determined that if one measured the surface temperatures substantially simultaneously over a significant area of the workpiece, averaged the temperatures and plotted the average of the temperature readings (Taver), the average temperature of the surface of the workpiece would climb up fast but uniformly during the deposition process as shown by line 24 in FIG. 2. In this invention Tavg can be controlled so that the average temperature of the workpiece will stay between a preselected maximum temperature, Tmaxi 25 and a preselected minimum temperature Tmini. From this it was concluded that a simple but effective measurement of the workpiece temperature in multiple locations, and calculation of an average temperature of the workpiece, Tavg, could be utilized for the control of at least one of the following: the flow rate of cryogenic coolant onto the workpiece, the coating deposition rate onto the surface of the workpiece, and/or the relative speed between the surface and the deposition head. The deposition rate is the amount of material ejected from the deposition head per unit time in the thermal deposition process. The term average and mean will be used interchangeably herein, unless otherwise indicated.

An improvement upon the basic concepts leading to temperature averaging (determining the mean) and adjusting cryogenic coolant flow (or coating deposition rate onto the workpiece surface, or relative speed between the workpiece surface and said deposition head) where Taver (mean of the multi-area temperature readings) remains above a preselected low temperature, Tmini, and below a preselected high temperature, Tmaxi, for minimizing thermally induced, local stresses between the coating and workpiece substrate surface and protecting the workpiece from localized thermal damage, resides in creating uniformity of temperature within the substrate and coating surfaces. A persisting non-uniformity of the temperature within the workpiece surface can be caused by variables such as workpiece geometry, non-optimum coolant application, and other, unoptimized parameters of the thermal deposition process. Therefore, in another embodiment of the process of the invention, the standard deviation from the mean of cumulative multi-area temperature readings will be determined and will allow for improved control because the mean of the multi-area temperature readings alone is unable to detect longer-term trends in the temperature evolution during coating process and/or excessive temperature fluctuations within the workpiece surface and the coating.

Figure 5:
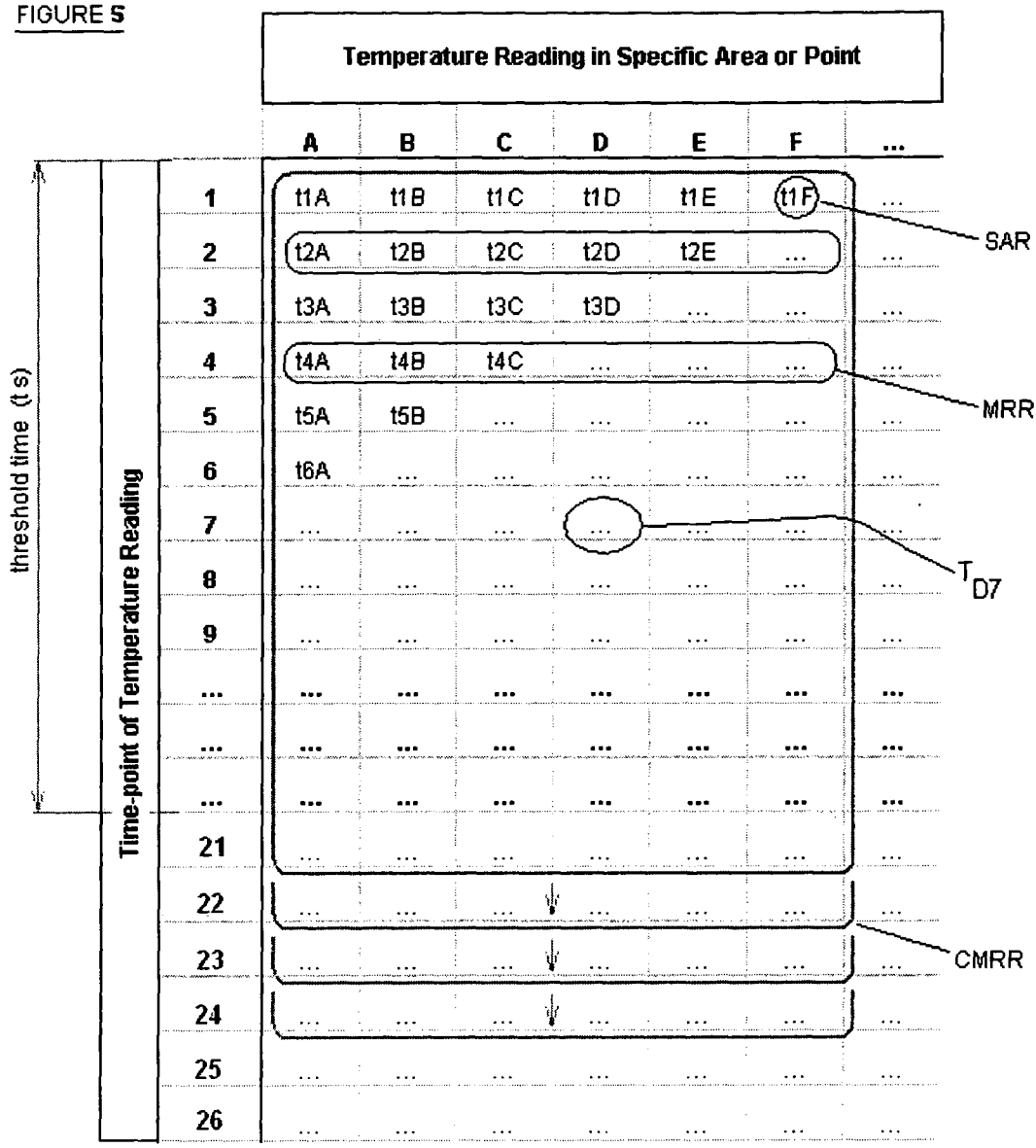
FIG. 5 is one embodiment of a temperature input recording matrix useful in the process of this invention.

The mechanics in the improved process control methods of this invention, illustrated in FIG. 3-6, involve, as a first step, the taking of multi-sensor single temperature area readings (SAR), substantially across the length width, diameter, or other dimensions of the surface of the workpiece 2, including the edge and midpoint areas. (The use of the terms length and width to describe dimensions of the workpiece are not limiting, because it is understood that the process of this invention can be used for workpieces having any shape and that other dimensional terms my be substituted for the terms lengths and widths.) For example, the location of the edge temperature measurements are identified as points c-i and k in FIG. 3 or A-F in FIG. 4. These temperature measurements are measured substantially simultaneously at each time-step, collected forming a multi area reading (MRR), and then averaged. The time-step is the interval of time between the substantially simultaneous measurement of the temperatures across the surface of the workpiece to be coated. The time-step will depend on the total time needed to coat a workpiece using the process of this invention, but may be for example 0.1 to 5 seconds or 0.5 to 1.0 seconds. The average, and more precisely, the mean of the multi area temperature readings taken at one time-step, designated mean(MRR), as stated heretofore, is used to control one or more of the following: the cryogenic coolant flow rate, the coating deposition rate onto the surface of the workpiece, and/or the relative speed between the surface and the deposition head, and maintain Taver between Tmaxi and Tmini. In a second step of the improved process control method, the standard deviation is used as a mechanism for temperature control. In this step, a certain threshold time (ts) is established after which the single area reading values measured at a (each) time-step start to be used for calculation not just of each MRR (along individual rows in FIG. 5) but also of a cumulative multi-area reading matrix, designated CMRR (within two-dimensions as shown in FIG. 5). The entire cumulative multi-area reading matrix population with all cumulative multi-area reading matrix values CMRR is continuously updated (vertically expanding) and used for standard deviation calculation with every new time-step past the threshold time. With this two-dimensional data matrix, the standard deviation of all temperature readings measured over a coating deposition cycle, designated S(CMRR) can be calculated. Once the standard deviation S(CMRR) has been calculated, it can be used to compare to previously determined and established control standard deviations. For example, there could be two established control standard deviations designated S1 and S2, where S2 is larger than S1; however in other embodiments there could be 1 or any number of control standard deviations. For the example in which two control standard deviations are used, the calculated standard deviation is compared to S1 and S2 and if the value of S(CMRR) is larger than the preselected values, at least one of the following actions can be executed: [1] the relative motion (speed) between the thermal deposition head and the surface of the workpiece may be accelerated, the coating deposition rate onto said surface may be decreased, and the cryogenic coolant application rate onto said workpiece may be increased or [2] the deposition of coating material may be temporarily suspended. In one embodiment the option [1] can be used if S(CMRR) is larger than S1 but smaller than S2, and option [2] can be used if S(CMRR) exceeds both S1 and S2.

Low standard deviation values of the cumulative multi-area readings S(CMRR), i.e., below S1, are desired because this indicates a time lapse-confirmed, thermal uniformity of the substrate (good heat spreading), assuring an acceptable coating quality and minimum risk of a locally overheated (or overcooled) and stressed workpiece and coating surface. Nonetheless, the actual standard deviation values of the cumulative multi-area readings and their significance for process control depends on many variables as well as the selection of the threshold time value. So, if for example, a coating process requires 5 complete passes of a thermal deposition head over the workpiece surface, it may be desirable to set the threshold time (ts) in such a way that the standard deviation values of the cumulative multi-area readings are calculated and used for process control, only after at least 50%, or at least 70%, or at least 90% of the portion of the workpiece surface has been coated with the $1^{st}$-pass layer. Alternatively, the cumulative multi-area reading matrix, CMRR, and standard deviation, S(CMRR); may be used to control the thermal deposition process only after the first pass of the thermal deposition head over the workpiece, meaning that the threshold time is set to the time it takes to put down the first full layer, or complete the first pass of the thermal deposition head over the work piece.

Summarizing from the above, the instantaneous mean value, or a mean value of the multi-area readings at one sampling time, mean(MRR) used to control the flow of cooling medium, may be calculated as shown in the first equation below.

$$\text{Mean}(MRR) = \frac{1}{M} \sum_{i=A}^{i=M} Tij$$

where:
Mean(MRR)=mean value of multi-area readings at one time
Tij=single temperature reading at one time and one area
i=A, B, C . . . M (number of temperature control areas)
j=1, 2, 3 . . . n (number of measurement time steps)
The mean (MRR) provides an instant, area-averaged thermal measurement of the surface of the workpiece to be coated. This result provides for a good estimate of large-scale, temperature changes at various points on the surface of the workpiece. In one embodiment, heat control for the workpiece is provided by controlling coolant flow to the workpiece surface to maintain the average (mean) of the multiple area temperatures between a preselected Tmaxi and Tmini.

In another embodiment, once past the threshold time, a mechanism for determining the standard deviation from the cumulative mean CMRR is represented by the equation:

$$S(CMRR) = \sqrt{\frac{1}{Mn}\sum_{\substack{i=A\\j=1}}^{\substack{i=M\\j=n}} T_{ij}^2 - \left(\frac{1}{Mn}\sum_{\substack{i=A\\j=1}}^{\substack{i=M\\j=n}} T_{ij}\right)^2}$$

where:

S(CMRR)=standard deviation of cumulative multi-area readings accumulated from start to actual measurement time Tij=single temperature reading at one time and one area i=A, B, C . . . M (number of temperature control areas)= j=1, 2, 3 . . . n (number of measurement time steps)

As noted above, the S(CMRR) may be compared to S1 and S2. Exceeding S1 indicates that the thermal uniformity of the workpiece surface is becoming marginal, and the heat spreading over that surface must be improved or the quality of the coating deposited may be poor. In one embodiment, a more uniform heat spreading may be achieved by accelerating the relative speed between thermal deposition head and the surface, i.e., by accelerating the motion of thermal deposition head and/or workpiece, with a corresponding acceleration of the coolant distributor, unless the distributor is stationary. The accelerated relative motion of the deposition head and the workpiece results in a thinner coating layer deposited per thermal deposition head pass, therefore, each acceleration is associated with a corresponding increase in the number of passes to deposit the coating of the target thickness. Alternatively or additionally, to achieve more uniform heat spreading, the coating deposition rate onto said surface can be decreased by decreasing the deposition rate of material from the deposition head, and/or the cryogenic coolant application rate onto said workpiece can be increased in response to a S(CMRR) greater than S1. The process could increase the speed of the workpiece or the speed of the deposition head or both to increase the relative motion of the workpiece and the deposition head.

Reaching and exceeding the standard deviation limit S2, which has a larger value than S1, indicates that the thermal uniformity of the workpiece surface has become progressively unacceptable, and the operation of thermal deposition head must be temporarily suspended during the coating process cycle before resuming in order to give the workpiece more time to spread the heat that was already deposited with coating material. Frequent or extended shutdowns of thermal deposition head during coating operation, resulting from reaching or exceeding the predetermined S2 value, indicate that changes in the set-up of the coolant distributor(s) or, perhaps, in the configuration of the entire system are required to prevent production rate losses. Additional standard deviation limits providing for alternative process control steps can be provided if desired as would be apparent based on what has already been described herein.

Figure 6:
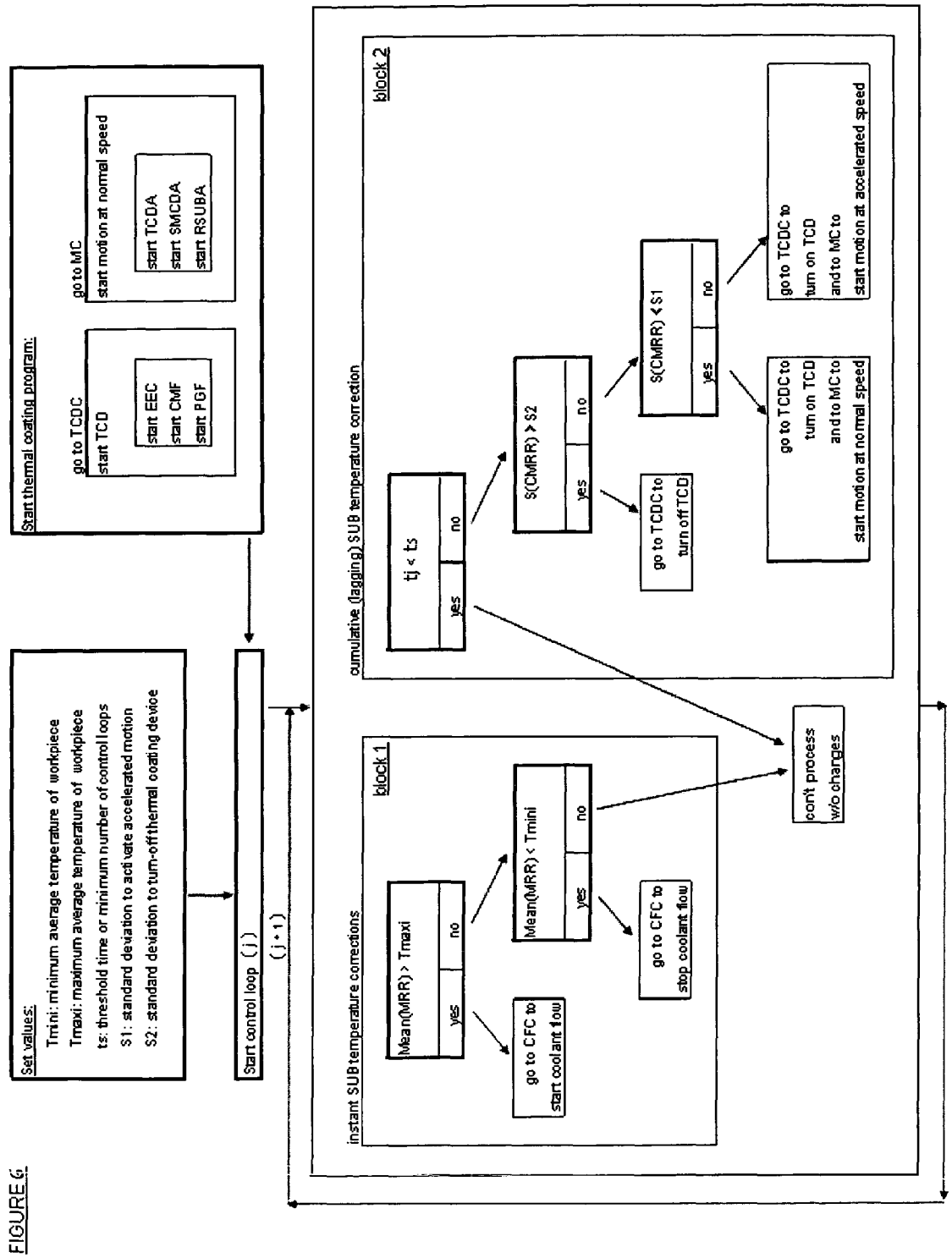
FIG. 6 is a flow diagram of one embodiment of the cooling control process of this invention showing two logic blocks for both heat control and uniform temperature control.

FIG. 6 illustrates and describes one method for controlling the average temperature and thermal uniformity of the workpiece in accordance with this invention. In this process the operation of the cryogenic cooling system, and the relative motion of the deposition head and the workpiece are controlled on the basis of two logical function blocks:

[1] instantaneous workpiece surface temperature corrections; and,

[2] cumulative or time-lagging temperature corrections.

Block 1 describes the control of the flow of coolant based on an actual value of the mean of the multi-area temperature readings, mean(MRR), while block 2 describes the control of the relative speed of thermal deposition head and workpiece, and the turning-off of the coating material discharge from the thermal deposition head, when required, based on the updated value of the standard deviation of the cumulation of the multi area temperature readings S(CMRR). Additionally, block 1 is used for coolant flow and temperature control in the test runs required to determine the limiting values of S1 and S2. Note that the values of Tmini and Tmaxi are determined by the coating process operator in advance of the coating and cooling process based on "external" material and process considerations and inputted into the control program in a step preceding block 1.

The following is the operating procedure during test runs (a) the personal computer/data acquisition (PC/DAC) system receives the Tmini, Tmaxi, and threshold time (ts) set points.

(b) the thermal deposition head is prepared for operation which involves a routine loading of the motion and the thermal deposition head programs to the respective controllers (for example, TCDC, MC and CFC, see FIG. 4), outside of the temperature control system;

(c) with the start of the coating process, in the first time-step (tj=1), a multi-area optical sensor MTOS, for example, reads individual single area reading values (SAR) from each control area or control point, while PC/DAC saves them in the first row of the time-temperature matrix as shown in FIG. 5 in the form of multi area temperature readings (MRR) and calculates their mean, mean(MRR). Note that each SAR has a temperature unit, e.g. degrees Celsius, and is defined within the matrix of temperature readings by two subscripts locating its column and row, for example, $T_{D7}$ is the temperature reading in the surface area D shown in FIG. 4, measured at the time-step 7 as illustrated in FIG. 5;

(d) in the first logical box, in block 1, shown in FIG. 6, the mean of the multi area temperature readings is compared to Tmaxi. If the mean is larger than Tmaxi, then the coolant flow starts (or may be increased when this step is repeated in the process) and the process repeats step (c) for the next time-step (tj=2); unless the mean is smaller than Tmaxi then the process continues to step (e);

(e) the second logical box in block 1 compares this mean value to Tmini. If the mean value is less than Tmini, then coolant flow is stopped, or the coolant valve stays in the closed position (if it were not opened before), and the process repeats step (c) for the next time-step (tj=2) (the workpiece is too cold, as it may happen at the start of the coating process, no setting is changed in the anticipation of workpiece increasing the temperature in the next time-steps); however, if the workpiece does not heat up within an expected amount of time, the process may shut down and/or indicate an error message to an operator;

(f) if the mean value is more than Tmini, then there is no change in the coolant flow status, i.e. the coolant continues to flow if it was opened before or continues to be stopped if it was stopped before; the process repeats step (c), in the following time-step (tj=2);

(g) the steps (c)-(f) are repeated with each new time-step (tj=2, 3, 4, 5 . . . ) or loop until the end of the entire coating process cycle as determined by the thermal deposition head controller (TCDC) and motion controller (MC) which are 'external' to the temperature control system. The values of S(CMRR) are calculated and saved by the PC/DAC system starting from the threshold time (ts) for the post test-run examination to determine S1 and S2; and, (h) then, after a few more test runs, if necessary, the operator examines coating quality, correlates it with the saved values of S(CMRR) and selects a value of S1 and S2 for the subsequent production runs.

The process for coating workpieces, after completing the test runs, starts with adding S1 and S2 to the set values (e.g. ts, Tmini and Tmaxi). In contrast to the test runs, block 1 and block 2 are now operating in parallel. The function of block 1 is the same as described above for the test run. Block 2 starts with a logical box checking if the actual time-step, tj, is less or more than the threshold time (ts). If tj is less than ts, the entire block 2 is skipped during the pending time-step, but tj and ts will be compared again in the next loop. Meantime, block 1 works just as in the test run. However, if tj is more than ts, the next logical box of block 2 checks if the actual S(CMRR) value exceeds the value of S2. If S(CMRR) is greater than S2 the thermal deposition head is turned off, suspending the deposition of the coating until the heat already delivered to the workpiece surface spreads out and makes the surface temperature more uniform. Note that turning-off the thermal deposition head doesn't disable the operation of block 1 which continues its own, independent control of mean (MRR), by turning coolant flow on or off, if required. If the S(CMRR) value is less then S2, the next logical box in block 2 compares the S(CMRR) to S1. If the S(CMRR) is less than S1, the program optionally makes sure that the thermal deposition head is on, in scan mode, and that the motions are executed at the normal speed, after which, the loop is restarted in the next time-step. If the mean is more than S1, the program signals the MC to accelerate the relative motion between the thermal deposition head and workpiece, optionally after making sure that the thermal deposition head is on. After this, the loop is restarted in the next time-step.

The advantages of the thermal control process of the embodiment of the present invention detailed in FIGS. 3, 4, 5 and 6 is the simplicity and flexibility of the process due to independent control of the workpiece cooling by block 1 and the heat spreading over the workpiece surface by block 2. The process algorithm avoids the programming and automation complexities of associating specific points on the thermal image of the workpiece surface with the actual position of the thermal deposition head, and/or adaptive manipulation of motion and coolant controllers according to the thermal gradients identified on complete, real-time thermographic images. Moreover, the calculation of S(CMRR), offers process operators an insight in and a chance for improving initial process parameters and cooling system configuration, so that with time and following a few test runs, corrections can be made and a fully stabilized coating production process may operate at a minimum value of S(CMRR), without triggering motion speed changes, and controlling only the coolant flow within block 1.

The following examples are provided to illustrate various embodiments of the invention and are not intended to restrict the scope thereof.

Example 1

Cylindrical Workpiece

The purpose of this example is to more fully explain the control parameters enumerated in the description of the process steps shown in FIG. 6. FIGS. 4, 5 and 6 are used to facilitate the description.

FIG. 4 illustrates a thermal deposition process employing a workpiece 40 comprised of a workpiece substrate surface 41 which has cylindrical shape and which is rotated during the thermal deposition coating process. The workpiece (RW) comprised of workpiece substrate surface 41 is mounted in a remotely actuated, rotating holder (RWA) 42, and exposed to hot coating deposition material 46 from the thermal deposition head (TCD) 44 which, in turn, traverses over the workpiece surface by the means of a separate actuated holder (TCDA). Traversing in sync with thermal deposition head 44 is an elongated, cryogenic coolant distributor (SCMD) 48 which provides the cooling effect either to the coated only portion of the substrate 41 or to the uncoated and coated portions of the workpiece surface. A CNC or robotic-type motion controller (MC) 50 coordinates the movements of the rotation of the workpiece 40, the motion of the thermal deposition head 44 and, optionally, coolant distributor 48.

Due to the rotation of workpiece 40, a non-contact, optical, multipoint system (MTOS) is used for temperature sensing. The multipoint optical sensor 52 can be an array of separate, single-point sensors or the multi-point sensor can be a thermographic (thermoimaging or thermovision) camera capable of mapping out thermal fields on examined surface and digitizing temperature outputs in selected areas within its view. Examples of suitable single-point sensors that can be arrayed for a multi-area temperature measurement include single or two-wavelength (two-color) infrared transmitters available from Micron Infrared, Raytek, Omega, and other vendors. As convenient in a given application, some of these sensors can be equipped with a laser-aiming device or they can transmit acquired optical signals via flexible optical fiber. The most demanding applications operating within a relatively high temperature range can use an array of self-correcting Quantum IR-thermometers from Micron which illuminate the target surface with a beam of laser in order to correct the initially assumed emissivity coefficient.

Presented symbolically in FIG. 4 temperature control points A through F can be distributed by the coating process operator over the surface of the workpiece 40 in any way found convenient in a given situation as long as that distribution is more or less uniform and, at least, some of the areas are located in the areas of the workpiece which are expected to be the most sensitive to temperature variations. The size of temperature control points or areas, e.g., A, B, . . . F shown in FIG. 5, is not critical and may vary depending on the type of thermal sensor used, but their number should be sufficient to reflect transient temperature distributions over the surface of the workpiece, and the temperature distribution over the coated and uncoated workpiece surface. Thus, at least four control points should be used for the coating of small workpieces, which are a few inches long or wide, while at least six and, preferably, more control points should be used for coating of larger workpieces.

To further illustrate the control of heat and temperature uniformity, assume a cryogenically cooled thermal deposition process, where a single pass of the thermal coating deposition head 44, (TCD), over the workpiece results in a 0.002-inch (51 μm) thick coating, but the target coating thickness is 0.010-inches (254 μm). Five passes are needed to reach the target at the normal traverse speed of the TCD used. Assume that the temperature sampling time-step is 0.5 seconds, and the TCD can traverse either at normal speed or at a doubled speed. The properties of the substrate and coating material, and prior tests involving coating of the workpiece in test runs using the specific TCD system have indicated that the following limiting values need to be used during production runs: Tmini=80° C., Tmaxi=140° C., S1=10° C., S2=40° C., and threshold time ts=20 iteration time-steps=10 seconds as required to complete the first pass. If the initial process parameters, including the location of cryogen distributors (SMCD) are right, the following are observations that may be made during the production run:

Taver or mean(MRR) starts from the initial temperature somewhat above room temperature and, then, slowly fluctuates during the coating operation between 80° C. and 140° C. and it is kept in this range by the cryogenic coolant flow control valve (CFC).

Mean value of the cumulative, multi-area readings accumulated during the coating operation, Mean(CMRR), a discrete process value which is used by the PC/DAC to calculate the standard deviation S(CMRR), fluctuates by much less than the instantaneous Taver, perhaps, within the range of 100° C. to 110° C.

S(CMRR) or standard deviation is calculated and updated every time-step from the iteration time-step #21 on for the population of all multi-area readings accumulated during coating operation (CMRR) and the value is less than 8° C. and fluctuates by about 1° C.

If the initial process parameters, including the location of distributors for the cryogenic coolant are not optimal, the observed values of Taver and Mean(CMRR) can still stay the same as before, but the standard deviation, S(CMRR), may run away during the coating operation to reach a value of, say, 20° C. after the iteration time-step #80. Since this value is more than the S1 limit, the processor would double the relative speed of the TCD with respect to the workpiece surface and double the number of remaining iteration time-steps from 20 more to 40 more, as well as the number of remaining TCD coating passes from one more to two more.

The increase in the relative traverse speed of the TCD and workpiece 40 should bring down the actual value of S(CMRR) to below S1. If the opposite happens, the controller will turn off TCD while continuing the control of Taver via cryogenic coolant flow. Thus, if after the iteration time-step #90, the actual value of S(CMRR) shoots up to 50° C., i.e., more than the S2 limit, the thermal coating device controller, TCDC, will shut down the thermal deposition head (TCD) and monitor the changes of S(CMRR) in the subsequent iteration time-steps. As soon as the actual S(CMRR) drops to below S2 (S2=40° C.), the coating action is restored at the double traverse speed according to the situation described above, with the number of missed iteration time-steps doubled and added to the number of remaining steps that are corrected for the doubled traverse speed as well.

Example 2

Figure 3:
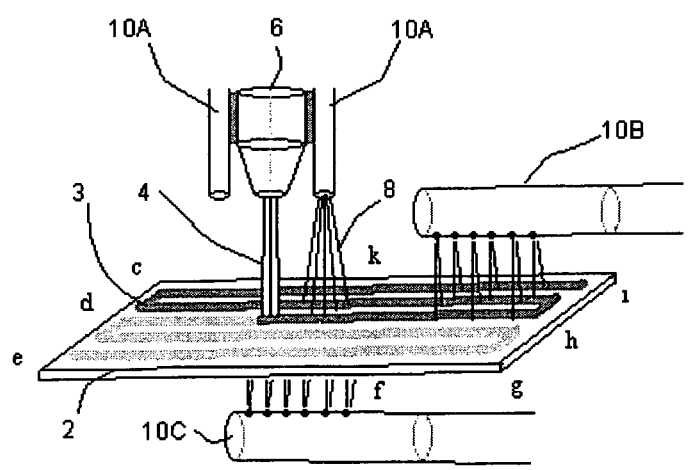
FIG. 3 is a system which can be used in the process of this invention showing various configurations and placement of cryogenic coolant distributors in a thermal deposition process.

FIG. 3 is a view of a thermal deposition process employing, optionally, both traversing and stationary cryogenic coolant delivery systems for the workpiece. Common pieces of equipment to those shown in FIG. 1 are similarly numbered. In showing a method for establishing cooling in the thermal deposition coating operations using a cryogenic gas coolant media, one or more coolant means 10A, 10A', 10B and 10C provide a coolant 8. These coolant means, such as 10A, 10A' may move with thermal deposition head 4, move as the distributor 48 shown in FIG. 4 moves, or remain stationary. Cooling the top side of the workpiece, that is the surface of the workpiece to be coated, where the heat is deposited with coating material is more desired than cooling the back side of the workpiece because of the resultant stress distribution. Of course, cooling the top side of the workpiece surface, whether the cooled portion of the surface was already coated or not, is more difficult. In one embodiment, coolant means, nozzle 10A is used to spray coolant on the surface of the workpiece when the deposition nozzle moves from points c, d, and e towards points 1, h and g, respectively and nozzle 10A' is used in the reverse directions. In these embodiments the coolant trails the deposition of material onto the surface.

In summary, the process of the present invention minimizes the stresses between the coating and the substrate of the workpiece developing over the length/width-scale of the entire workpiece and, further, protects the substrate from thermal damage by averaging multi-sensor temperature readings and using this average value to control an instantaneous coolant flow rate and, optionally, coating material deposition flow rate, and/or the relative motion (speed) between the workpiece and the deposition head. The process also minimizes local stresses developing between various portions of workpiece surface due to substrate geometry, non-optimum coolant application, and other, unoptimized parameters of the thermal deposition process by calculating the standard deviation of all temperature readings and bringing this standard deviation value to below some predetermined values by either increasing the relative motion speed between the thermal coating deposition device and the workpiece, increasing the coolant flow rate, decreasing the deposition flow rate and/or by temporarily suspending deposition of coating material. The procedure of the present invention accepts both contact and non-contact temperature sensor inputs. The areas or points of these temperature sensors should be distributed over the entire surface of the workpiece to be cooled. The process is simple to implement in the industrial production, and assures reliable cooling control in spite of various momentary upsets characterizing thermal deposition coating operations, even in the case of the most difficult applications involving refrigerated and/or cryogenic coolant media.

The invention claimed is:

1. A process for the thermal deposition coating of a workpiece, said process comprising the steps of:
    (a) thermally depositing material on a thermally conductive surface of a workpiece from a deposition head wherein at least one condition selected from the group of: coating deposition rate, relative motion between the surface and said deposition head, and cryogenic coolant flow rate onto said workpiece is controllable;
    (b) substantially simultaneously measuring temperatures at a plurality of locations over the surface of the workpiece;
    (c) determining an average temperature of the temperatures measured in step (b);
    (d) comparing the average temperature to a preselected minimum temperature and a preselected maximum temperature for the workpiece;
    (e) automatically adjusting at least one of the controllable conditions if said average temperature is not between the preselected minimum temperature and the preselected maximum temperature for the workpiece;
    (f) determining the standard deviation between said average temperature and a cumulation of said measured temperatures;
    (g) comparing the standard deviation to a second preselected standard deviation, S2; and
    (h) suspending the thermally depositing material if said standard deviation is greater than said second preselected standard deviation, S2;
    wherein said thermal deposition coating process is selected from the group consisting of high-velocity oxy-fuel spraying, high-velocity air-fuel spraying, DC plasma spray, RF plasma spray, electric arc spraying, laser powder coating, laser powder cladding, transferred arc coating operations and welding overlay deposition.

2. The process of claim 1 where the relative motion between the surface and the deposition head is adjusted in step (e).

3. The process of claim 1 where the coating deposition rate is adjusted in step (e).

4. The process of claim 1 where said measuring step is performed by optical temperature sensors.

5. The process of claim 1 where said measuring step is performed by contact and non-contact type sensors.

6. The process of claim 1 where said measuring step is performed by sensors measuring temperatures substantially over the entire surface of the workpiece.

7. The process of claim 1 where the cryogenic coolant flow rate onto the workpiece is adjusted in step (e).

8. The process of claim 1 further comprising the steps of:
(i) repeating steps (b) through (i) if said standard deviation is greater than said second preselected standard deviation, S2.

9. The process of claim 8 further comprising the steps of:
(j) comparing the standard deviation to a first preselected standard deviation, S1; and
(k) adjusting at least one of the controllable conditions if said standard deviation is greater than a first preselected standard deviation, S1.

10. The process of claim 9 further comprising the step of:
(l) repeating steps (a) through (l).

11. The process of claim 10 where the cryogenic coolant flow rate is adjusted in step (k).

12. The process of claim 10 where the cryogenic coolant flow rate onto the workpiece is adjusted in step (e).

13. The process of claim 12 where the cryogenic coolant flow rate onto the workpiece is adjusted in step (k).

14. The process of claim 10 where the relative motion between the surface and the deposition head is adjusted in step (k).

15. The process of claim 1 where a coolant means providing said cryogenic coolant is attached to and moves with said deposition head.

16. A process for the thermal deposition coating of a workpiece, said process comprising the steps of:
(a) thermally depositing material on a thermally conductive surface of a workpiece from a deposition head wherein at least one condition selected from the group of: coating deposition rate, relative motion between the surface and said deposition head, and cryogenic coolant flow rate onto said workpiece is controllable;
(b) substantially simultaneously measuring temperatures at a plurality of locations over the surface of the workpiece;
(c) determining an average temperature of the temperatures measured in step (b);
(d) comparing the average temperature to a preselected minimum temperature and a preselected maximum temperature for the workpiece;
(e) automatically adjusting at least one of the controllable conditions if said average temperature is not between the preselected minimum temperature and the preselected maximum temperature for the workpiece;
(f) determining the standard deviation between said average temperature and a cumulation of said measured temperatures;
(g) comparing the standard deviation to a first preselected standard deviation, S1;
(h) adjusting at least one of the controllable conditions if said standard deviation is greater than a first preselected standard deviation, S1; and
(i) repeating steps (a) through (i);
wherein said thermal deposition coating process is selected from the group consisting of high-velocity oxy-fuel spraying, high-velocity air-fuel spraying, DC plasma spray, RF plasma spray, electric arc spraying, laser powder coating, laser powder cladding, transferred arc coating operations and welding overlay deposition.

17. The process of claim 16 where the cryogenic coolant flow rate onto the workpiece is adjusted in step (e).

18. The process of claim 16 where the relative motion between the surface and said deposition head is increased in said adjusting step (e).

19. The process of claim 16 where the coating deposition rate is adjusted in step (e).

\* \* \* \* \*